United States Patent [19]

Caron

[11] Patent Number: 5,125,268

[45] Date of Patent: Jun. 30, 1992

[54] METHOD AND APPARATUS FOR ACOUSTICALLY MEASURING RAINFALL

[75] Inventor: Albert B. Caron, Wellington, Fla.

[73] Assignee: The United States of America as represented by the Secretary of the Navy, Washington, D.C.

[21] Appl. No.: 728,905

[22] Filed: Jul. 8, 1991

[51] Int. Cl.$^5$ .............................................. G01W 1/14
[52] U.S. Cl. .................................. 73/171; 73/861.41; 340/602; 364/555
[58] Field of Search ............................ 73/171, 861.41; 340/602; 364/555

[56] References Cited

U.S. PATENT DOCUMENTS

| | | | |
|---|---|---|---|
| 2,807,012 | 9/1957 | Schwarz | 73/861.41 |
| 3,446,069 | 5/1969 | Zink | 73/171 |
| 4,520,667 | 6/1985 | Nelson | 73/171 |
| 4,827,766 | 5/1989 | Nelson | 73/171 |

FOREIGN PATENT DOCUMENTS 0033078 2/1985 Japan ................................... 73/171

Primary Examiner—Donald O. Woodiel
Attorney, Agent, or Firm—Michael J. McGowan; Prithvi C. Lall; Michael F. Oglo

[57] ABSTRACT

A method and apparatus are provided for acoustically measuring precipitation rates and total amounts of rainfall. The rainfall is collected in a reservoir and drained through a gravity feed tube system. The gravity feed tube system receives a steady flow of rainfall draining from the reservoir and converts the steady flow into drops by means of surface tension within the tube system. The formed drops exit the tube system and impact a surface that is acoustically responsive to the impact. The acoustically responsive surface is monitored to count the number of drops impacting same, wherein the number of drops counted is indicative of the precipitation rate and total amount of rainfall.

24 Claims, 2 Drawing Sheets

METHOD AND APPARATUS FOR ACOUSTICALLY MEASURING RAINFALL

STATEMENT OF GOVERNMENT INTEREST

The invention described herein may be manufactured and used by or for the Government of the United States of America for Governmental purposes without the payment of any royalties thereon or therefor.

BACKGROUND OF THE INVENTION (1) Field of the Invention

The present invention relates generally to rain gauges and more particularly to a method and apparatus for acoustically measuring rainfall.

(2) Description of the Prior Art

Prior art rain gauges measuring up to professional standards generally fall into four categories: (1) Tipping gauges, (2) Weighing gauges, (3) Optical gauges and (4) Capacitance gauges. The basic operating principles and inherent drawbacks of each of these gauges will be described briefly hereinbelow in order to provide a more clear understanding of the advantages of the present invention.

Tipping gauges are devices that collect precipitation by alternately filling two small buckets, each of which holds a precise amount of water. When one bucket fills, a mechanism allows the filled bucket to tip thereby emptying its contents. The number of bucket tips is counted with a mechanical or electrical counter. While this type of gauge is used extensively by the United States Weather Service, its disadvantages include: (1) high maintenance due to its mechanical nature, (2) its propensity to jam or malfunction during heavy downpours, and (3) the requirement that a firm and level mounting surface be used to maintain the system's stability and vertical position.

Weighing gauges are devices that simply collect precipitation in a bucket and convert the weight into curvillinear movement of a recording pen's inked trace on a moving paper chart. However, evaporation of the collected rainfall over time makes it difficult to interpret the chart recording. In addition, weighing gauges are relatively inaccurate in recording rainfall rates due to slow chart speeds. Weighing gauges are also mechanically complex and require periodic emptying of the bucket.

Optical gauges focus a horizontal light beam across a calibrated path length through which the precipitation falls. Typically, the light beam is generated by an infrared light emitting diode. Whenever the precipitation falls through this horizontal beam, a fluctuation of the beam results. The amount of fluctuation is proportional to the intensity of the precipitation rate, and is measured by analyzing the frequency of the fluctuation. The optical gauge does not accumulate the rainfall directly, but makes a measurement by electronically summing or integrating instantaneous rainfall rates. Accordingly, small errors in instantaneous rates are compounded into larger errors when measuring total rainfall amounts over an extended time. Additionally, its use is somewhat restricted due to its cost and complexity.

Capacitance gauges are devices that uses capacitance to measure the amount of rainfall collected in a water column. Specifically, the water column serves as the capacitor's dielectric material. As the water column rises, a DC voltage proportional to the amount of water in the column is indicative of the amount of precipitation. However, the opening of the water column that receives the precipitation is relatively small compared to other gauges. Accordingly, its accuracy is not well established. Furthermore, once the water column is filled, the entire contents must be siphoned off before it can again measure precipitation.

To summarize, the major disadvantages associated with the aforementioned rain gauges are cost, mechanical complexity and/or the need for frequent maintenance. However, the presence of any one of these disadvantages in a rain gauge makes it inappropriate for widespread use in one of the many thousands of remote locations around the world (on land or at sea). Unfortunately, none of the prior art methods or apparatus provides an inexpensive combination of steps or parts to achieve accurate, maintenance-free rainfall measurements.

SUMMARY OF THE INVENTION

Accordingly, it is an object of the present invention to provide an accurate and maintenance-free method and apparatus for measuring precipitation rates and total amounts of rainfall.

It is a further object of the present invention to provide a method and apparatus for measuring precipitation rates and total amounts of rainfall that is functionally and mechanically simple thereby resulting in a low cost implementation.

Still another object of the present invention is to provide a method and apparatus for measuring precipitation rates and total amounts of rainfall that can function at remote land or sea locations.

Other objects and advantages of the present invention will become more obvious hereinafter in the specification and drawings.

In accordance with the present invention, a method and apparatus are provided for acoustically measuring precipitation rates and total amounts of rainfall. The rainfall is collected in a reservoir and then drained from the reservoir through a gravity feed tube system. The gravity feed tube system receives a steady flow of rainfall draining from the reservoir and converts the steady flow into drops by means of surface tension within the tube system. The formed drops exit the tube system and impact a surface that is acoustically responsive to the impact. The acoustically responsive surface is monitored to count the number of drops impacting same, wherein the number of drops counted is indicative of the precipitation rate and total amount of rainfall.

BRIEF DESCRIPTION OF THE DRAWING(s)

DESCRIPTION OF THE PREFERRED EMBODIMENT(s)

Figure 1:
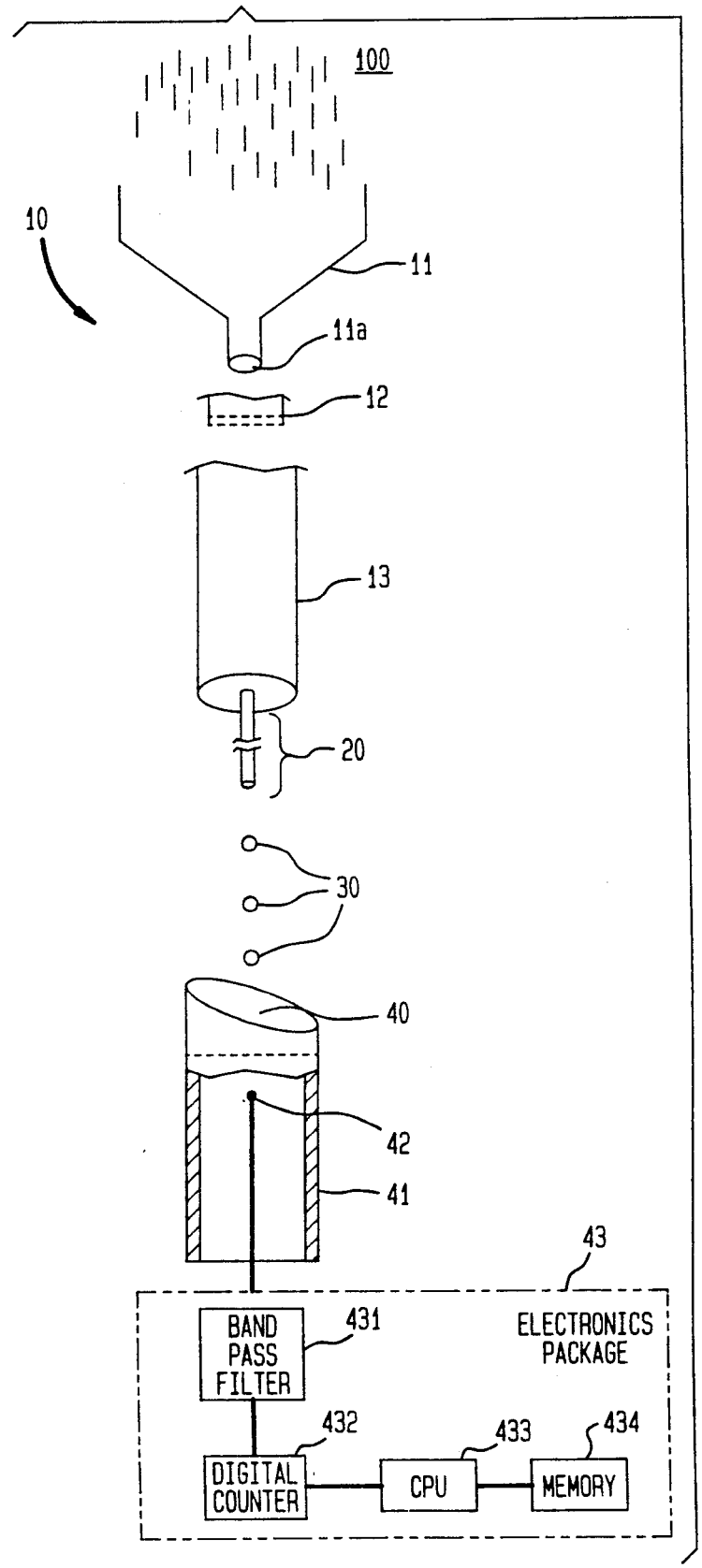
FIG. 1 is a schematic representation of a preferred embodiment acoustic rain gauge built according to the teachings of the present invention.

Referring now to the drawings, and in particular to FIG. 1, a schematic representation of a preferred embodiment acoustic rain gauge is shown for purposes of illustrating the basic principles of the present invention. Accordingly, it is to be understood that specific gauge designs may vary depending on particular needs of the end user. Several of these design alternatives will be noted in the description to follow.

The acoustic rain gauge used is indicated generally by reference numeral 10 and includes a collector 11 for catching the precipitation or rainfall droplets 100 (or rainfall as it will be called hereinafter). Collector 11 funnels the rainfall through drain hole 11a into a reservoir 13. The choice of collector 11 is not an inventive feature of the present invention and may be standardized with other rain gauge collectors.

A filter 12 is typically placed between collector 11 and reservoir 13 to remove dirt or other particles that could clog various parts of rain gauge 10 as will become readily apparent in the description to follow. Pore size of the typical filter is approximately 0.1 millimeters while the filter 12 is generally made from a non-corrosive material such as polyester or teflon. However, the choice of filter material and associated pore size are not restrictions o the basic operating principles of the present invention.

Reservoir 13 temporarily stores the collected rainfall passing through filter 12. Once in reservoir 13, the collected rainfall is drained therefrom under the force of gravity through a drainage tube system 20. Drainage tube system 20 is shown only in section since its design is a critical feature of the present invention that will be described in greater detail hereinbelow. It is sufficient at this point in the description to say that drainage tube system 20 converts a steady flow of rainfall draining from reservoir 13 into a progression of drops 30 by means of surface tension within system 20.

Drops 30 exit drainage tube system 20 and fall through the air under the force of gravity. At some predetermined distance below the drainage tube system 20, drops 30 impact a rigid (i.e. high Young's modulus) plate 40 that is fixably mounted by its edges to a housing 41 (shown in cross-section). Plate 40 is positioned in housing 41 such that, after impact, each of the drops 30 drains from the surface of plate 40. Accordingly, plate 40 is shown angled at approximately 15° with respect to the horizontal plane of impact.

Materials used for, and dimensions of, plate 40 are chosen such that the impact from each drop 30 generates a measurable acoustic response. Ideally, the generated acoustic response should be one whose frequency is easily distinguished (i.e., filtered) from any ambient noise expected from the particular environment to which the gauge 10 is exposed. Generally speaking, this means that a frequency response on the order of 1300 Hz or greater is preferred since most ambient noise (e.g. human generated noise, environmental noise, etc.) occurs in the range of 800–1200 Hz or lower.

Materials selected for plate 40 should be non-corrosive in addition to being rigid owing to their extended exposure to water. Accordingly, suitable materials include plexiglass or non-corrosive metals such as aluminum. The dimensions of plate 40 must achieve a balance between frequency response and stability of environment in which rain gauge 10 will be used. For example, if rain gauge 10 were to be located on a buoy at sea, even though a smaller diameter plate would yield a higher frequency acoustic response upon drop impact, a larger diameter plate might be required to assure that all drops 30 impact plate 40 even in the most violent storm.

In order to detect the acoustic response associated with each impact, a microphone 42 is isolated from ambient noise by being placed in housing 41 just beneath plate 40. Microphone 42 may be any conventional general purpose microphone or may be a special purpose microphone as dictated by the specific design. Further isolation of microphone 42 from ambient noise may be achieved by lining housing 41 with conventional sound attenuation material (not shown).

The acoustic response detected by microphone 42 is typically fed to an electronics package 43 encompassing one of many conventional designs. For purposes of description, a typical package 43 might include a band-pass filter 431 operating in the region of 1000 to 1300 Hz to detect the high frequency end of the drop impact spectrum while rejecting most of the lower frequency ambient noise. A constant voltage threshold level of filter 431 could be set such that a drop impacting plate 40 always exceeds that level, while all forms of background noise rarely or never exceeds the threshold. The number of threshold crossings (i.e., the number of drops falling from tube 22 onto the impact plate 40) is accumulated in a digital counter circuit 432. A microcomputer chip or CPU 433 would then be used to scale the number of drops in counter 432 to a mass equivalent of fluid per unit time. The data generated by CPU 433 could be stored in a memory 434 as shown. Alternatively, the data could be sent directly to a readout device (not shown) or transmitted by radio frequency to some central location. Accordingly, it is to be appreciated that the devices used to process the acoustic response in order to count the number of drops, as well as the handling of the resulting count, is purely a design choice.

Figure 2:
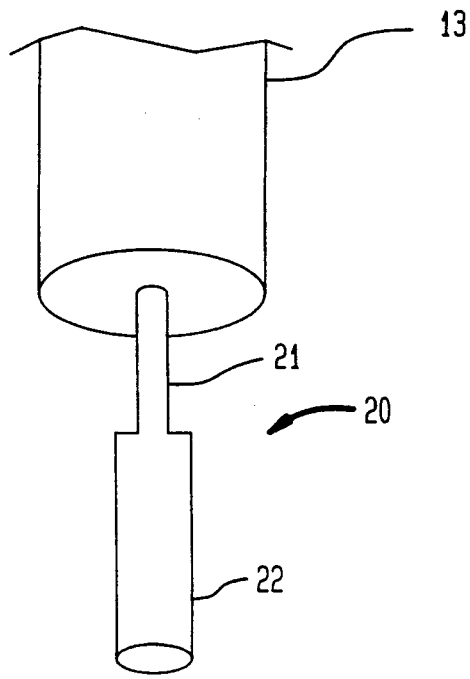
FIG. 2 is a detailed view of a preferred embodiment drainage tube system used in the present invention.

Referring now to FIG. 2, a more detailed drawing of a preferred embodiment of drainage tube system 20 is shown extending from reservoir 13 (shown only in section). In particular, system 20 includes a first drainage tube 21 connected to, and coaxially aligned with, a second drainage tube 22, where the inside diameter of tube 21 is less than that of tube 22. Typically, the inside diameter of tube 22 is twice that of tube 21. The rate of flow exiting tube 21 (i.e., dV/dt) is governed by Poiseuille's Law as discussed in any standard general physics text such as "University Physics" by Sears, Zemansky and Young and is given by:

$$\frac{dV}{dt} = \frac{\pi p r^4}{8L\eta}$$

where p is the fluid pressure head above the exit of tube 21; r is the inside radius of tube 21; L is the length of tube 21; $\eta$ is the viscosity of the rainfall; and V is the velocity of the fluid inside tube 21.

The inside diameter and length of tube 21 are chosen to limit the total flow rate at the exit of tube 22 such that drops will always form at the exit of tube 22 for the maximum sustained rainfall rate for which the gauge is designed. Since the flow rate varies as $r^4$ (Poiseuille's Law) for equivalent length tubes, tube 22 has only a minor effect in restricting flow because its inside radius is typically twice that of tube 21. Thus, the function of tube 22 is to allow surface tension to form larger drops at its exit than the drops that would form at the exit of tube 21. If tube 22 were not incorporated in the design, a sustained high rainfall rate would cause a steady stream flow at the exit of tube 21 (instead of drops 30) due to the increased pressure head in the reservoir 13. However, by providing the larger exit diameter of tube 22 at the exit of tube 21, even a steady stream flow from tube 21 can be formed into drops 30. Accordingly, this structure extends the dynamic range (in terms of rainfall rates) that can be measured. It should be further noted that this principle can be carried out for a series of cascading tubes whereby the inside diameters of each successive tube in the series increases. Such a system would be particularly useful for a location that was known to experience a wide variety of rainfall rates. However, there is a limit to the drop sizes that may be formed through such a cascading series. Further, it has been shown experimentally that deluges exceeding four inches per hour do not permit the formation of drops 30 regardless of the configuration of drainage tube system 20. However, rainfall rates of this magnitude are extremely uncommon.

The drops 30 emanating from tube 22 will be uniform in size because surface tension varies only slightly with air temperature. At low to moderate rainfall rates, the flow from tube 22, in drops per unit time, will equal the volume of water entering gauge 10. At the maximum design rainfall rate capacity of gauge 10, there will be a slight lag between the output and input until the pressure head in reservoir 13 builds up to increase the flow rate from tube 22 to an equilibrium point. This lag time can be adjusted by proper selection of the diameter of reservoir 13 (e.g., small diameter reservoirs provide short lag times because the pressure head increases faster).

The advantages of the present invention are numerous. The method and apparatus for acoustically measuring rainfall would require minimal user maintenance since no moving parts are required. Therefore, it is immediately a good candidate for use in remote locations. Furthermore, since all parts of the device can be made of non-corrosive material, the device will enjoy a long useful life. The simplicity of the design approach should keep production costs far below that of the prior art designs. Finally, the counting of drops is inherently a digital measurement approach thereby simplifying calibration and providing great flexibility in output processing.

Figure 3:
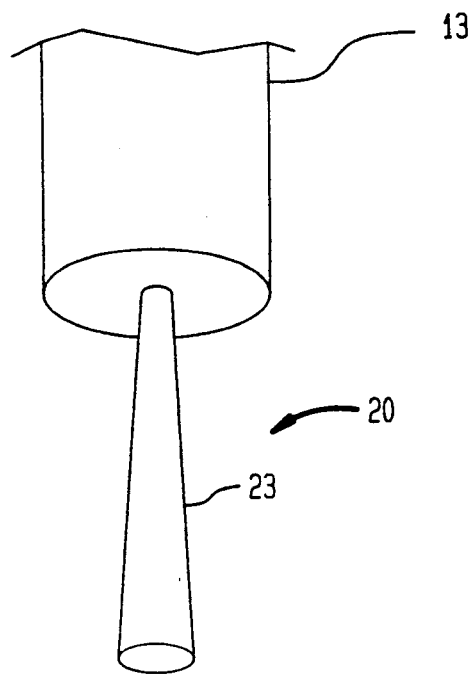
FIG. 3 is an alternative embodiment of the drainage tube system.

As noted above, the implementation of this design approach is attainable by a variety of apparatus designs and material selection. For example, as an alternative to the preferred embodiment described above, drainage tube system 20 of FIG. 1 might consist of a single, conically shaped drainage tube 23 as shown in FIG. 3. In this way, drops would form within conical tube 23 in strict proportion to the rate of rainfall. Note also that all component parts, including the packaging of the rain gauge, could be made from non-corrosive plastic. Thus, it will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. A method for acoustically measuring precipitation rates and total amounts of rainfall, comprising the steps of:
   collecting the rainfall in a reservoir;
   draining the rainfall from the reservoir through a gravity feed tube system;
   forming, from the rainfall, drops of water within the gravity feed tube system, wherein the drops exit the tube system and impact a surface that is acoustically responsive to the impact; and
   monitoring the acoustically responsive surface to count the number of drops impacting same, wherein the number of drops counted is indicative of the precipitation rate and total amount of rainfall.

2. A method according to claim 1 wherein said step of forming comprises the step of creating the drops by means of surface tension within the gravity feed tube system.

3. An apparatus for acoustically measuring precipitation rates and total amounts of rainfall, comprising:
   means for collecting the rainfall;
   means for draining the rainfall from said collecting means in the form of drops, wherein the drops exit said draining means to fall through the air under the force of gravity;
   means, placed beneath said draining means, for receiving an impact from the drops falling through the air and for generating an acoustic response to the impact; and
   means for monitoring the acoustic response to count the number of the drops falling through the air as an indication of precipitation rate and amount of total rainfall.

4. An apparatus as in claim 3 wherein said draining means comprises a drainage tube system in communication with said collecting means for receiving a steady flow of rainfall draining from said collecting means and for converting the steady flow into the drops by means of surface tension with said drainage tube system.

5. An apparatus as in claim 4 wherein said drainage tube system comprises a cascading series of coaxially aligned drainage tubes, each of said tubes having a different inside diameter wherein said cascading series progresses, with respect to said collecting means, from a tube having the smallest inside diameter to a tube having the largest inside diameter.

6. An apparatus as in claim 5 wherein said cascading series comprises:
   a first drainage tube in communication with said collecting means, said first drainage tube having an inside diameter, whereby the rainfall exits said collecting means through said first drainage tube; and
   a second drainage tube, in communication with said first drainage tube, for receiving the rainfall exiting said first drainage tube, said second drainage tube having an inside diameter approximately equal to twice the inside diameter of said first drainage tube, wherein the drops are formed by means of surface tension within said second drainage tube.

7. An apparatus as in claim 4 wherein said drainage tube system comprises a conically shaped tube having its small diameter end in communication with said collecting means.

8. An apparatus as in claim 3 wherein said means for receiving the impact comprises:
   a housing; and
   an impact responsive plate mounted in said housing to receive the impact from the drops falling through the air and to generate the acoustic response to the impact, wherein the frequency of the acoustic response is greater than the frequency of ambient noise unrelated to the acoustic response.

9. An apparatus as in claim 8 wherein said impact responsive plate comprises a plexiglass plate.

10. An apparatus as in claim 8 wherein said impact responsive plate comprises a non-corrosive metal plate.

11. An apparatus as in claim 8 wherein said monitoring means comprises:
   a microphone mounted within said housing to detect the acoustic response of said impact responsive plate; and
   means for filtering the acoustic response detected by said microphone in order to count the number of drops.

12. An apparatus as in claim 11 further comprising sound absorbing material maintained within said housing for isolating said microphone from the ambient noise.

13. An apparatus as in claim 11 wherein said filtering means comprises:
   a bandpass filter for detecting a predetermined frequency range of the acoustic response of the impact, wherein each detection of the predetermined frequency range serves as an indication of a drop impacting said impact responsive plate;
   a digital counter connected to said bandpass filter for counting the number of drops; and
   a central processing unit for equating the number of drops counted to a mass equivalent thereof for a unit of time to provide a measure of precipitation rates and total amount of rainfall.

14. An apparatus as in claim 13 wherein the predetermined frequency range is between 1000 to 1300 Hz.

15. An apparatus as in claim 13 further comprising memory means for storing the precipitation rates and total amount of rainfall.

16. An apparatus as in claim 8 wherein said impact responsive plate is positioned such that, after impact, the crops drain from the surface of said impact responsive plate.

17. An apparatus for acoustically measuring precipitation rates and total amounts of collected rainfall, comprising:
   a reservoir for temporarily storing the collected rainfall;
   a flow restricting tube in communication with said reservoir for restricting the flow of the stored rainfall as it exits said reservoir through said flow restricting tube under the force of gravity;
   a drip tube in communication with said flow restricting tube for transporting the rainfall exiting said flow restricting tube and for forming the exiting rainfall into uniformly sized drops within said drip tube by means of surface tension, whereby the uniformly sized drops exit said drip tube to fall through the air under the force of gravity;
   an impact plate mounted in a housing beneath said drip tube for receiving the impact of the uniformly sized drops as they fall from said drip tube, wherein the impact of each of the uniformly sized drops generates an acoustic response;
   a microphone mounted within said housing and beneath said impact plate for detecting the acoustic response generated by each impact; and
   means for counting each impact based upon the acoustic response detected by said microphone, wherein the number of impacts counted is indicative of the precipitation rate and amount of total rainfall.

18. An apparatus as in claim 17 further comprising a filter for filtering the rainfall prior to the rainfall entering said flow restricting tube.

19. An apparatus as in claim 17 further comprising sound absorbing material within the housing of said impact plate to isolate said microphone from ambient noise unrelated to the acoustic response.

20. An apparatus as in claim 17 wherein said impact plate is positioned such that, after impact, said uniformly sized drops drain from the surface of said impact plate.

21. An apparatus as in claim 17 wherein the inside diameter of said drip tube is approximately twice as large as the inside diameter of said flow restricting tube.

22. An apparatus as in claim 17 wherein said counting means comprises:
   a bandpass filter for detecting a predetermined frequency range of the acoustic response generated by each impact, wherein each detection of the predetermined frequency range serves as an indication of a drop impacting said impact plate;
   a digital counter connected to said bandpass filter for counting the number of drops; and
   a central processing unit for equating the number of drops counted to a mass equivalent thereof for a unit of time to provide a measure of precipitation rates and total amounts of collected rainfall.

23. An apparatus as in claim 17 wherein the predetermined frequency range is between 1000 to 1300 Hz.

24. An apparatus as in claim 17 further comprising memory means for storing the precipitation rates and total amounts of collected rainfall.

* * * * *